United States Patent [19]

Dunn

[11] 3,837,068

[45]*Sept. 24, 1974

[54] METHOD OF MAKING A COMPOSITE HIGH-STRENGTH SLEEVE

[75] Inventor: William M. Dunn, Farmington, Mich.

[73] Assignee: Federal-Mogul Corporation, Southfield, Mich.

[ * ] Notice: The portion of the term of this patent subsequent to May 30, 1989, has been disclaimed.

[22] Filed: Aug. 3, 1972

[21] Appl. No.: 277,820

Related U.S. Application Data

[62] Division of Ser. No. 152,862, June 14, 1971, Pat. No. 3,762,881.

[52] U.S. Cl............. 29/420.5, 29/182.2, 29/505, 29/DIG. 18, 75/208 R, 75/226
[51] Int. Cl............................................ B22f 3/24
[58] Field of Search........ 29/DIG. 18, DIG. 31, 420, 29/420.5, 191.2, 505, 525, 182.1, 182.2; 75/208 R, 226

[56] References Cited
UNITED STATES PATENTS

| | | | |
|---|---|---|---|
| 2,652,520 | 9/1953 | Studders | 29/182.2 |
| 2,913,819 | 11/1959 | Andreotti et al. | 29/420.5 |
| 2,970,905 | 2/1961 | Doll | 75/208 R |
| 3,665,585 | 5/1972 | Dunn et al. | 29/420 |
| 3,720,512 | 3/1973 | Yamaguchi et al. | 75/226 X |

*Primary Examiner*—Charles W. Lanham
*Assistant Examiner*—D. C. Reiley, III

[57] ABSTRACT

A composite high-strength machine element such as a sleeve (FIG. 6) consists of a heavy load bearing or working portion composed of sintered powdered high-performance alloy and a supporting portion which undergoes less concentrated or intense loads is made of a base metal such as sintered powdered iron. Where the outer portion of the sleeve is the heavy load bearing portion (FIG. 1) and the inner sleeve is the lower-stressed portion (FIG. 2) the outer portion is provided with an internal taper while the inner portion is provided with a matching external taper. The two portions are separately formed from powdered metal by suitable dies in standard briquetting presses and are then sintered at temperatures from 2,100° to 2,150° F. (FIG. 5). After sintering, the two portions are maintained at or brought up to forging temperatures from 1,500° to 2,100° F. and forged by forcing them together in a hot-forging press (FIG. 3), thereby producing the composite high-strength machine element shown in FIG. 4, with the outer and inner portions firmly and inseparably forged into union with one another. The densities of the two powdered metal components are converted, from approximately 75 percent after briquetting, to 98 percent or more after being united by the hot-forging operation. Photomicrographs of sections of such composite machine elements (FIG. 7), after subsequent carburizing and hardening heat treatment, show an excellent interlock resulting from a migration of the metals into one another at the tapered joint. Torsion tests (FIGS. 8 and 9) performed on test specimens cut longitudinally from these composite machine elements at the tapered joint between the two forged components show adequate strengths without failure along the junction surfaces. These strengths compare favorably with the strengths of similar single solid metal specimens.

A modification (FIG. 6) differs from the foregoing form of the invention by employing slightly different converging tapers in the outer and inner components otherwise follows the same procedure set forth above, resulting in a similarly excellent interlock by migration of the metals at the interface, as also shown by photomicrographs (FIG. 10).

2 Claims, 11 Drawing Figures

METHOD OF MAKING A COMPOSITE HIGH-STRENGTH SLEEVE

This is a division of my co-pending application Ser. No. 152,862, filed June 14, 1971, for Composite High-Strength Machine Element and Method of Making the Same, now U.S. Pat No. 3,762,881.

Figure 1:
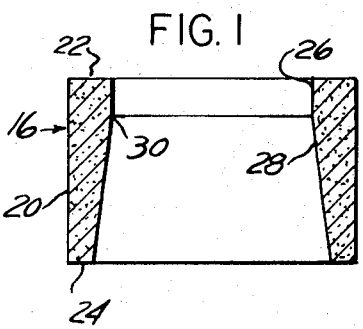
FIG. 1 is a longitudinal section through the outer powdered metal component, after briquetting and sintering, according to one form of the invention.
Figure 2:
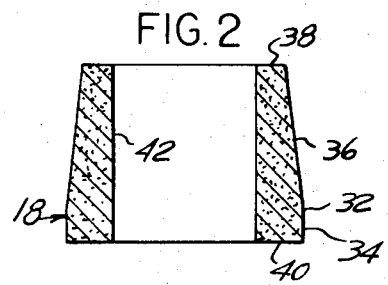
FIG. 2 is a longitudinal section through the inner powdered metal component, after briquetting and sintering, according to the same form of the invention.
Figure 4:
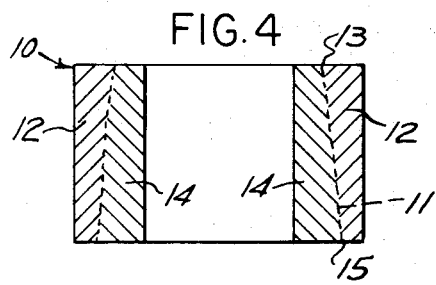
FIG. 4 is a longitudinal section through the composite sleeve, after forging.

Referring to the drawings in detail, FIG. 4 shows a composite high-strength sleeve, generally designated 10, according to one form of the invention, as composed of a high-performance alloy outer sleeve 12 joined at an approximately conical or tapered interface 11 to a plain iron inner sleeve 14 with opposite flat annular end surfaces 13 and 15. The sleeves 12 and 14 are formed from sintered powdered metal outer and inner components 16 and 18 respectively (FIG. 3) according to the procedure shown in the flow chart or diagram in FIG. 5. The outer and inner components 16 and 18 (FIGS. 1 and 2) are formed by briquetting a suitable high performance alloy and iron respectively in the die cavities of conventional briquetting presses (not shown), each having a core rod and upper and lower punches, by briquetting procedures well known to those skilled in the powdered metallurgy art. The dies for briquetting the outer components 16 are so formed as to impart to the outer component 16 an outer cylindrical surface 20, upper and lower annular surfaces 22 and 24, a relatively short upper inner cylindrical bore surface 26, and a lower tapered or conical bore surface 28, with the surfaces 26 and 28 collectively forming a partially tapered and partially cylindrical inner surface 30.

The dies for briquetting the inner component 18, on the other hand, are so formed as to provide an outer surface 32 consisting of a relatively short lower cylindrical surface 34 and an upper conical or tapered surface 36, the surface 36 having the same taper as the surface 28 of the outer component 16. The short cylindrical surfaces 26 and 34 provide clearances with the adjacent tapered surfaces 36 and 28 respectively. These clearances receive the sidewise flow of metal during forging and thereby prevent "folding over" at the opposite ends 13 and 15. The inner component 18 has upper and lower flat annular surfaces 38 and 40, respectively, and an inner cylindrical surface 42. The outer component 16 is formed by briquetting a powder of a suitable high performance metal or metal alloy, the particular alloy being used as exemplary in the present invention being the so-called S.A.E. 4,600 alloy powder. The inner component 18, which does not require the load-bearing characteristics of the outer portion 12 of the composite sleeve 10, is formed from plain iron powder. The tapered surfaces 28 and 36 are both formed with matching tapers of 3°. Briquetting is carried out to produce a density of approximately 75 percent in the finished briquettes 16 and 18. Separate sintering is then carried out at a temperature between 2,100° and 2,150° F., individually for each piece.

The sintered powdered metal outer and inner components or sleeves 16 and 18 are then placed in telescoped relationship, the temperatures of both components are then brought to a predetermined forging temperature within the range of 1,500° to 2,100° F. and then placed in the cylindrical die bore 42 of a forging press 44. The latter is provided with a hot-forging die set 45 including a die plate 46 containing the cylindrical die bore 42, a lower tubular punch 48 and an upper tubular punch 50 adapted to telescope with the die bore 42 and having flat annular facing surfaces 52 and 54 respectively adapted to produce the flat annular end surfaces 13 and 15, respectively, in the composite high strength sleeve or machine element 10 (FIG. 4). The lower tubular punch 48 (FIG. 3) is provided with a cylindrical bore 56 while the upper punch 50 is provided with a cylindrical bore 58 of the same diameter formed within a tubular lower portion 60 depending from a main tapered upper punch portion 62. A cylindrical core rod 64 with an outer cylindrical surface 66 is adapted to telescope with the lower and upper punch bores 56 and 58 and with the die bore 62 to define a die cavity 68.

Figure 3:
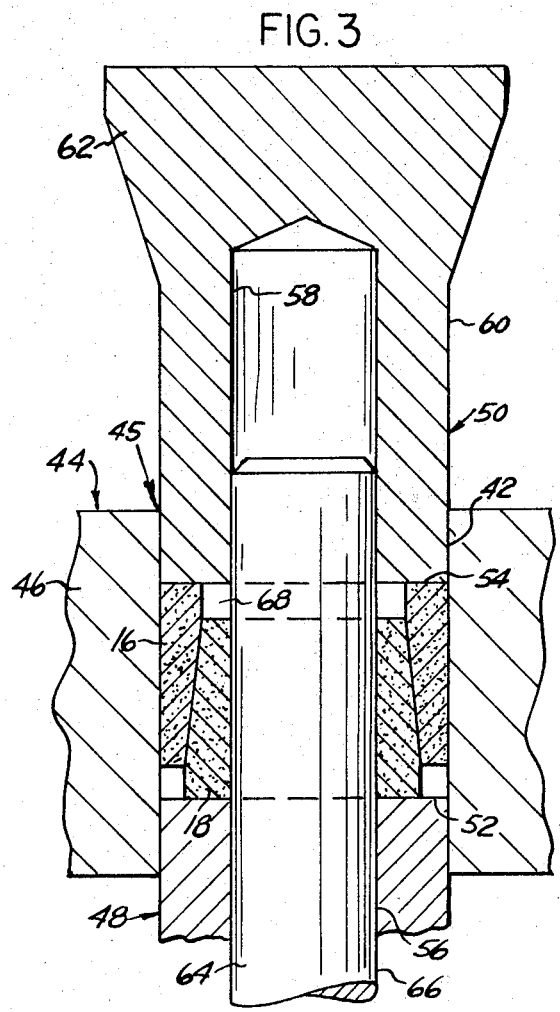
FIG. 3 is a longitudinal section through a hot-forging die in a hot-forging press, showing the outer and inner components of FIGS. 1 and 2 at the start of the hot-forging operation of uniting them into a composite sleeve.
Figure 10:
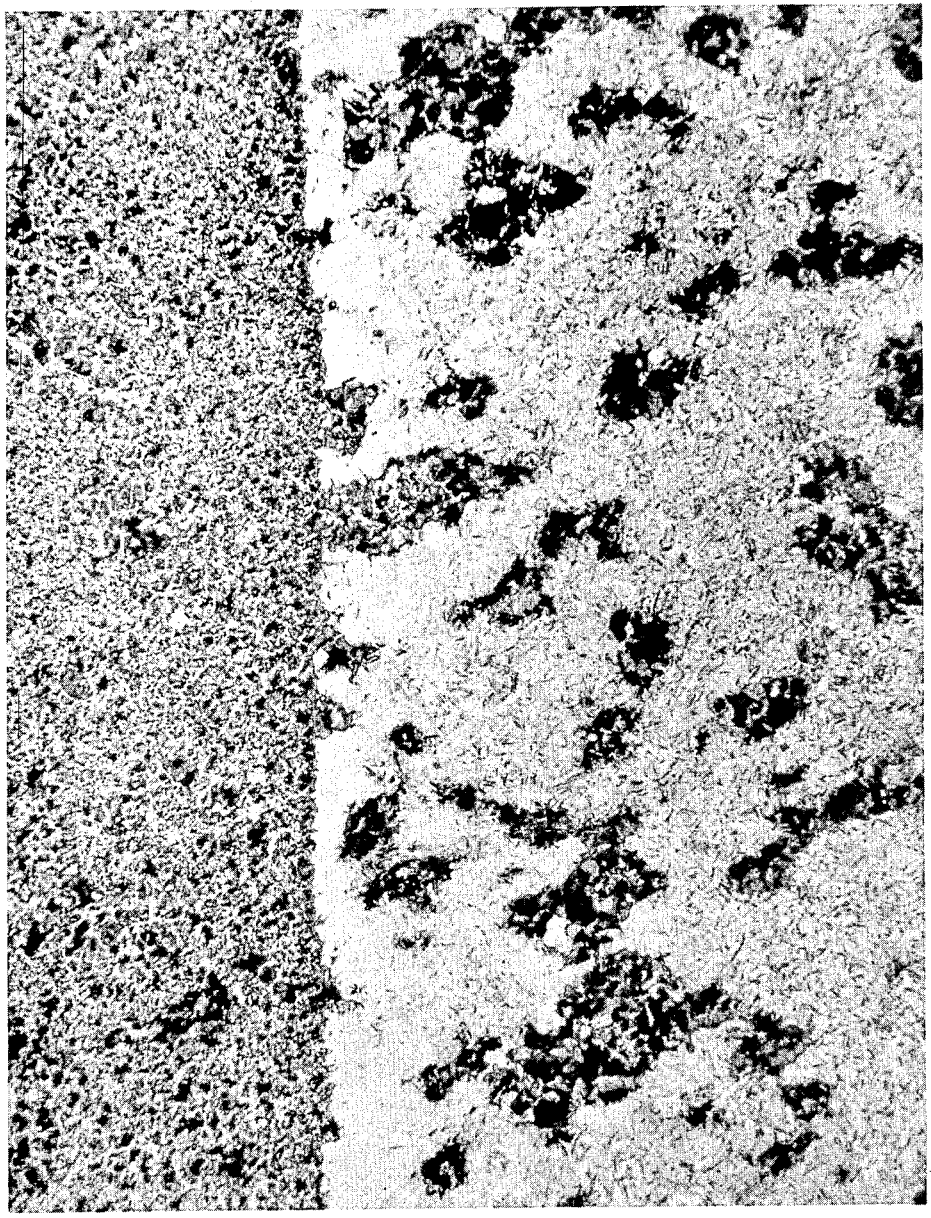
FIG. 10 is a photomicrograph similar to FIG. 7 but showing the interlocking of the different metals at the interface of a longitudinal section of the modification involving the differently tapered components shown in FIG. 6, after hot-forging.

In carrying out the method (FIG. 5) of making the composite high-strength machine element 10 of FIG. 4, the outer high performance alloy component 16 and the inner performance component 18 are separately briquetted to densities of approximately 75 percent in separate briquetting dies to produce the configurations described above. The briquettes 16 and 18 (FIGS. 1 and 2) are then separately sintered at temperatures preferably between 2,100° and 2,150° F. with the upper tubular punch 50 retracted upward so as to leave the mouth of the die cavity 68 open. The sintered briquettes 16 and 18 are then removed from the sintering oven and transferred to the die cavity 68 of the forging die set 45 of the forging press 44 at a predetermined temperature between 1,800° and 2,100° F. Alternatively, it may be more convenient to reheat the sintered components 16 and 18 prior to placing them in the forging die cavity 68, due to loss of heat sustained in making the transfer from the sintering oven to the forging press 44. The thus heated sintered outer and inner components 16 and 18 are placed in the forging die cavity 68 in telescoping relationship. (FIG. 3). The upper punch 50 is moved dowward with the cylindrical surface 42 of the die plate 46 preventing lateral metal flow and the top surface 52 of the lower punch 48 acting as an anvil to effect axial motion of the outer sleeve 16 relatively to the inner sleeve 18. This hot forging operation is carried out with sufficient force to drive the outer component with the internal tapered surface 28 of the outer component 16 axially downward upon the outer tapered surface 36 of the inner component 18 and to raise the density of the composite element to about 98 percent, or substantially solid metal. This action causes the end surfaces 22 and 24 of the outer component 16 to move into substantially co-planar relationship with the end surfaces 38 and 40 respectively of the inner component 28 (FIG. 4). This relative axial motion between the tapered surfaces 28 and 36 of the outer and inner components 16 and 18 under the effect not only of the initial heating of the outer and inner components 16 and 18 but also that generated by the force of compression, causes a scrubbing action at the interface 11 which results in an excellant and continuous welding between the two components 12 and 14 and produces a migration of the metals of the two components 12 and 14 across the interface 11 which results in an inseparable and continuous interlocking thereof along the interface 11, as shown by the photomicrograph (FIG. 10), wherein the light-colored portion is the high strength alloy and the dark-colored portions the iron.

Figure 8:
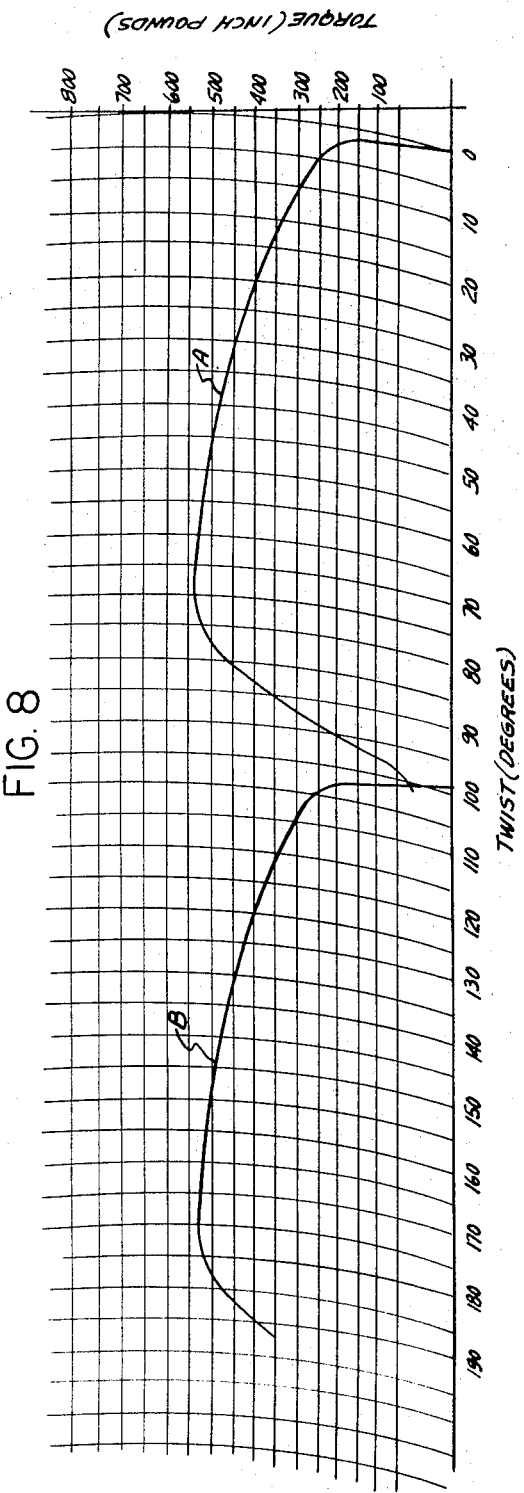
FIGS. 8 and 9 are reproductions of graphical test charts produced by tension tests made upon specimens cut from the composite sleeves, as shown in FIG. 4.
Figure 9:
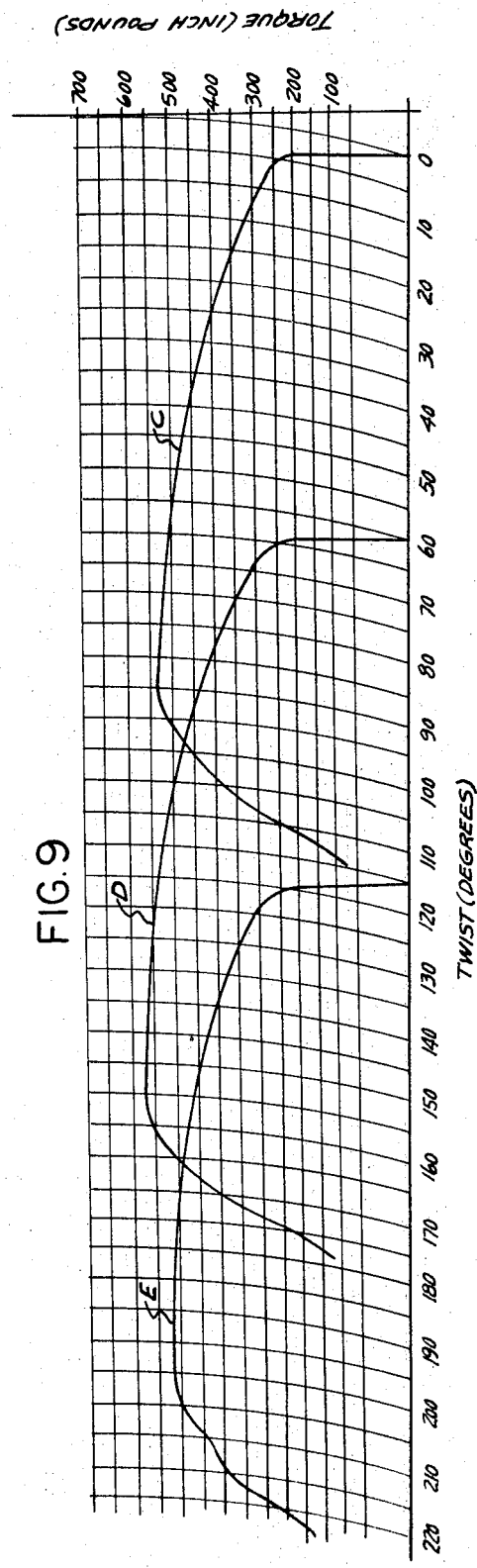

Torsions tests (FIGS. 8 and 9) of standard specimens cut longitudinally from the composite machine element or sleeve 10 at the interface 11 therebetween confirm the exceptional interlocking obtained at the interface 11. These specimens comprised rectangular blocks one inch in length and 0.312 inches square with the interface 11 disposed midway between the longitudinal side surfaces. The tests were performed in the torsion testing machine disclosed and claimed in the Haller U.S. Pat. No. 3,122,915 of Mar. 3, 1964 for Torsion Testing Machine. In these two graphic charts, the abscissae represent the applied twist to the specimen in degrees whereas the ordinates indicate the applied torque in inch pounds. The curves obtained were drawn by a pen moving transversely to the motion of the chart. The peaks of the curves A, B, C, D and E represent the peak torque measured in inch pounds obtained when the test specimen began to fracture or fail, and the rotation or twist of the test specimen in degrees at which such failure occurred is indicated by the reading of the horizontal scale designated by the words "twise (degrees)." Thus, it will be seen that test specimen A failed after a rotation of 82° at a peak torque of 545 inch pounds, specimen B after a rotation of 82° at a peak torque of 540 inch pounds, specimen C after a rotation of 94° at a peak torque of 540 inch pounds, specimen D after a rotation of 101° at a peak torque of 555 inch pounds, and specimen E after a rotation of 85 degrees at a peak torque of 500 inch pounds.

Long experience and extensive experimentation with the torsion testing machine identified above prove that empirical formulae could be developed which would employ the results of experimental tests to indicate the tensile strength and the percentage of elongation for a given rotation which could be expected in such test specimens. These empirical formulae are as follows:

Tensile strength (1bs. per square inch) = peak torque (inch pounds)/0.007

Percentage of elongation = peak rotation (degrees) 5°

Thus, the estimated tensile strength for specimen A is 77,850 p.s.i. with 16.4 percent elongation; for specimen B a tensile strength of 77,143 p.s.i. with 16.2 percent elongation; for specimen C a tensile strength of 77,143 p.s.i. with 19 percent elongation; for specimen D a tensile strength of 79,286 p.s.i. with 20 percent elongation; and for specimen E a tensile strength of 71,430 p.s.i. with 17 percent elongation.

Figure 5:
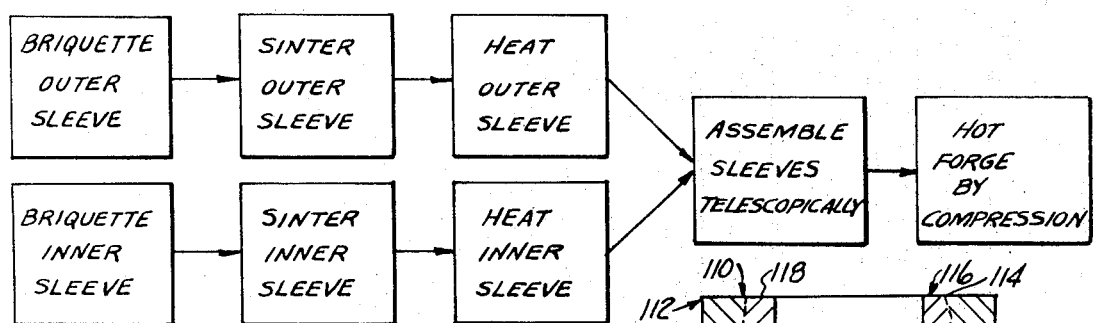
FIG. 5 is a flow diagram of the steps involved in the method of making the composite sleeve of FIG. 4.
Figure 6:
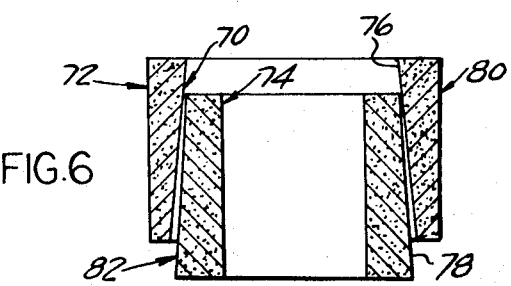
FIG. 6 is a longitudinal section through a modification of the invention shown in FIGS. 1 to 5 inclusive, wherein the outer and inner components possess slightly different coverging tapers, with the components assembled immediately prior to hot forging as in FIG. 3.

By forging the modified construction shown in FIG. 5 in the die cavity 68 of the die set 45 of the forging press 44, according to the same procedure described above, a substantially identical compoiste high-strength machine element is produced to the composite machine element 10 shown in FIG. 4. The sole difference in the construction is that the assembly, generally designated 70, of the outer sleeve or component 72 of high performance alloy with the inner component 74 of base metal, such as plain iron, brings together differently tapered internal and external conical surfaces 76 and 78 of the outer and inner components 80 and 82 respectively. In particular, the internal conical surface 76 of the outer component 80 is provided with an approximately 3° taper, whereas the outer conical surface 78 of the inner component 82 is provided with a 2° taper. The briquetting, reheating, sintering and forging procedures, including the temperatures and pressures involved, remain substantially the same as those set forth above in connection with the production of the composite high performance machine element 10 of FIG. 4 and achieve similar results. A similar interlocking at the interface corresponding to the interface 11 is also produced, with a similar migration of the two metals into one another at that interface, as shown by the photomicrograph in FIG. 10. Torsion tests of the modified construction of FIG. 6 using converging tapers instead of identical tapers also resulted in no failures along the interface but where the test was carried out to the point of failure or rupture, such failure occurred at locations other than at the interface, in a manner similar to results of the torsion tests of the form of the invention shown in FIG. 4.

The above-mentioned nickel-content S.A.E. 4,600 iron alloy powder has the following composition:

| manganese | 0.20% ) | with the remainder iron, |
|---|---|---|
| nickel | 1.75% ) | plus carbon to suit. |
| molybdenum | 0.25% ) | |

The nickel-free high-performance iron alloy powder also mentioned above has the following composition:

| manganese | 0.48% ) | with the remainder iron, |
|---|---|---|
| nickel | none% ) | plus high carbon 0.59% |
| molybdenum | 0.59% ) | or low carbon 0.28%. |

Heat treatment of the composite bushing 10 or 30 is carried out in the usual and customary manner. It will of course be understood that the word "iron" as used herein includes iron having carbon therein for controlling the hardness desired, as achieved by such heat treatment. It also includes carburization for providing a hardened external surface, such as by case hardening.

Figure 11:
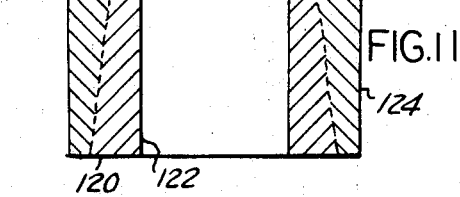
FIG. 11 is a longitudinal section through the composite sleeve, after forging, with the positions of the components of FIG. 4 reversed.
Figure 7:
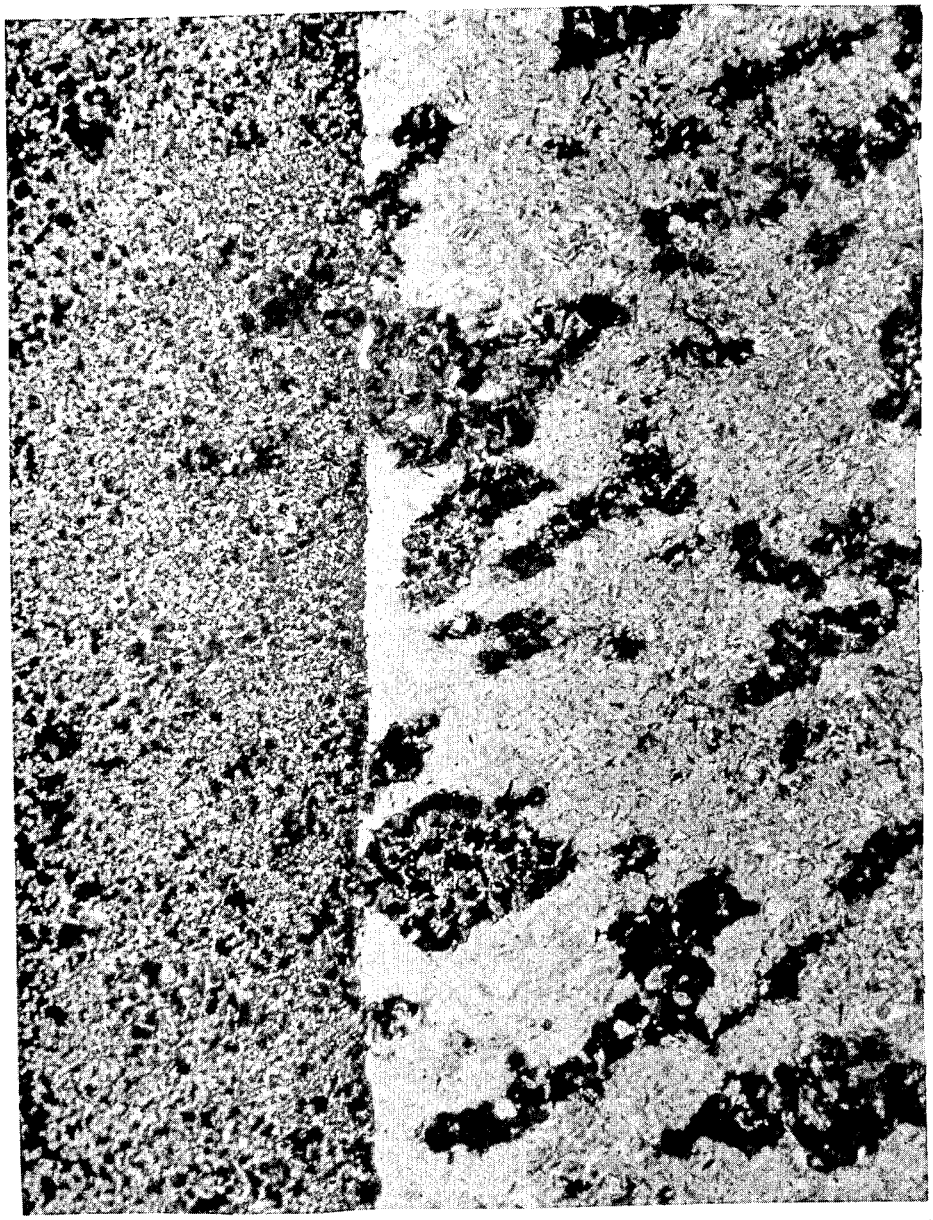
FIG. 7 is a photomicrograph of a longitudinal section of the composite sleeve of FIG. 4 showing the interlocking of the different metals at the interface.

In a modification of the invention, FIG. 11 shows a composite high-strenght sleeve, generally designated 110, as consisting of a reversal of the components shown in FIG. 4, namely as composed of an iron outer sleeve 112 joined at an approximately conical or tapered interface 114 to a high performance alloy inner sleeve 116 with opposite flat annular end surfaces 118 and 120. The sleeves 112 and 116 are formed from sintered powdered iron and high performance alloy outer and inner components shaped like the components 16 and 18 (FIG. 3) according to the procedure described above for producing the composite high-strength sleeve 10 0f FIGS. 1 to 4 inclusive shown in the flow chart or diagram of FIG. 5. Accordingly, it is believed that no further explanation is needed. It will be understood that the composite sleeve 10 of FIG. 4 is suitable for the inner race of a roller bearing, whereas the composite sleeve 110 is suitable for the outer race thereof, with conventional cylindrical rollers disposed in the annular space therebetween. It will also be understood that the modified composite sleeve 110 is suitable for use as a high performance plain sleeve bearing for rotatably supporting a shaft (not shown) in its bore 122 while its outer cylindrical surface 124 is mounted in the usual counterbore or seat in the machine frame or other supporting structure (not shown).

I claim:

1. A method of making a composite high-strength sleeve, comprising forming an inner component briquette of powdered ferrous metal with a generally cylindrical inner surface therein and a generally frustoconical external surface thereon, froming an outer component briquette of powdered manganese-molybdenum powdered alloy with a generally-frustoconical internal surface therein and a generally cylindrical outer surface thereon, sintering said components individually, forgingly heating said components to a forging temperature, assembling said forgingly heated components into telescoped mating engagement with one another, and applying axial forging pressure to said forgingly heated components sufficient to unite said components in forged interlocking engagement with one another.

2. A method of making a composite high-strength sleeve, according to claim 1, wherein the taper of said generally-frustoconical external surface is slightly less than the taper of said generally frustoconical internal surface, and wherein said application of said axial forging pressure to said forgingly heated components deforms said generally frustoconical external and internal surfaces of different tapers into mating interlocking engagement with one another at a common generally frustoconical interface.

* * * * *